United States Patent
Kim et al.

(10) Patent No.: US 8,536,760 B1
(45) Date of Patent: Sep. 17, 2013

(54) BALL-ELECTRIC POWER GENERATOR

(71) Applicant: K-Technology USA, Inc., Pico Rivera, CA (US)

(72) Inventors: Ki Il Kim, Los Angeles, CA (US); Sang Woo Kim, Yongin (KR); Young Kim, Los Angeles, CA (US); Keunyoung Lee, Suwon (KR); Seongsu Kim, Seoul (KR)

(73) Assignee: K-Technology USA, Inc., Los Angeles, CA (US)

( * ) Notice: Subject to any disclaimer, the term of this patent is extended or adjusted under 35 U.S.C. 154(b) by 0 days.

(21) Appl. No.: 13/763,641

(22) Filed: Feb. 9, 2013

Related U.S. Application Data

(63) Continuation-in-part of application No. 13/748,135, filed on Jan. 23, 2013.

(51) Int. Cl.
*H02N 1/04* (2006.01)

(52) U.S. Cl.
USPC .......................... 310/310; 310/309

(58) Field of Classification Search
USPC ............... 310/300, 308, 309, 310; 322/2 A, 322/2 R
IPC ............................. H02N 1/00, 1/04
See application file for complete search history.

(56) References Cited

U.S. PATENT DOCUMENTS

| | | | |
|---|---|---|---|
| 4,990,813 A * | 2/1991 | Paramo | 310/309 |
| 5,034,648 A | 7/1991 | Gastgeb | |
| 7,525,205 B2 * | 4/2009 | Mabuchi et al. | 290/1 R |
| 8,269,401 B1 * | 9/2012 | Kim et al. | 310/339 |
| 2008/0083139 A1 * | 4/2008 | Mullen | 36/136 |
| 2008/0213529 A1 | 9/2008 | Gray et al. | |
| 2010/0097292 A1 | 4/2010 | Peczalski | |
| 2010/0171393 A1 | 7/2010 | Pei et al. | |
| 2010/0295415 A1 * | 11/2010 | Despesse et al. | 310/300 |
| 2011/0148248 A1 * | 6/2011 | Landa | 310/306 |
| 2013/0049531 A1 * | 2/2013 | Wang et al. | 310/309 |

FOREIGN PATENT DOCUMENTS

DE            4028313 A1 *   3/1992

OTHER PUBLICATIONS

Machine Translation, DE 4028313 A1, Mar. 12, 1992.*
Flexible triboelectric generator!, Fan et al., Jan. 10, 2012.
Plastic Power: Triboelectric Generator Produces Electricity by Harnessing Frictional Forces Between Transparent Polymer Surfaces, Georgia Tech Research News, John Toon, Jul. 9, 2012.

* cited by examiner

*Primary Examiner* — Tran Nguyen
*Assistant Examiner* — Thomas Truong
(74) *Attorney, Agent, or Firm* — Novick, Kim & Lee, PLLC; Jae Youn Kim

(57) ABSTRACT

A ball-electric power generator is provided, in which triboelectric power can be generated by friction when balls made of one of triboelectric series having different shapes of spheres, sheets, rods, wires and the like move and hit layers or substrates made of one of the triboelectric series in a chamber defined by the layers or substrates and a spacer connecting the layers.

10 Claims, 9 Drawing Sheets

_US 8,536,760 B1_

BALL-ELECTRIC POWER GENERATOR

CROSS-REFERENCES TO RELATED APPLICATIONS

This application is a continuation-in-part (CIP) application of U.S. patent application Ser. No. 13/748,135 filed on Jan. 23, 2013 entitled "A GRAPHENE TRIBOELECTRIC CHARGING DEVICE AND A METHOD OF GENERATING ELECTRICY BY THE SAME," which is hereby incorporated by reference in its entirety. Since U.S. Pat. No. 8,269,401 is incorporated by reference in U.S. patent application Ser. No. 13/748,135, U.S. Pat. No. 8,269,401 is also incorporated by reference herein in its entirety.

BACKGROUND OF THE INVENTION

1. Field of the Invention

One or more embodiments of the present invention relate to a graphene triboelectric charging device and a method of generating electricity by the same. Further, the present invention relates to a ball-electric power generator using balls made of triboelectric series with layers. Here, the term "ball-electric power generator" means a power generator as claimed in which triboelectric power can be generated by friction when balls made of one of triboelectric series having different shapes of spheres, sheets, rods, wires and the like move and hit layers or substrates made of one of the triboelectric series in a chamber.

2. Description of the Related Art

In general, a device that generates electric charges, separates the charges with opposite signs and uses the potential generated by them to drive a flow of free electrons, is called as an electric generator. The electric generator has a long history and has been developed continuously.

Energy harvesting and conversion devices have received increasing interest recently because they are likely to play a vital role in driving a self-powered device. Our daily life is full of energy. However, not all energies are harvested for use. For example, our daily activities include mechanical movements such as walking, touching, and frictionizing. However, most of these mechanical movements are not converted to usable energy. A need for such device, which can harvest these wasted energy and convert them to useful energy, has been present for a long time.

SUMMARY OF THE INVENTION

Aspects of the present invention provide a triboelectric charging device and a method of generating electricity by the same. Additional aspects will be set forth in part in the description which follows and, in part, will be apparent from the description, or may be learned by practice of the presented embodiments.

Additional aspects will be set forth in part in the description which follows and, in part, will be apparent from the description, or may be learned by practice of the presented embodiments.

According to an aspect of the present invention, there is provided a triboelectric charging device that may include an electric power generating unit including: a triboelectric layer having a triboelectric material, a polyester layer disposed to face the triboelectric layer, and a graphene layer interposed between the triboelectric layer and the polyester layer, a holder accommodating the electric power generating unit and having an uneven surface configured to receive a portion of the electric power generating unit when it is deformed, and a friction unit disposed to face the electric power generating unit and configured to deform the electric power generating unit, wherein the friction unit is disposed to face the uneven surface.

According to an aspect of the present invention, the triboelectric layer may include polydimethylsiloxane (PDMS). The triboelectric layer may also include polymethyl methacrylate (PMMA).

According to an aspect of the present invention, the polyester layer may include polyethylene terephthalate (PET). The polyester layer may also include polyethersulfone (PES).

According to an aspect of the present invention, an electric power generating unit further may include a spacer which is interposed between the graphene layer and a triboelectric layer, and the graphene layer is spaced apart from the a triboelectric layer.

According to an aspect of the present invention, the triboelectric charging device may further include a stack of a plurality of the electric power generating unit and at least each of the plurality of the electric power generating unit is electrically coupled to at least one another of the plurality of the electric power generating unit.

According to an aspect of the present invention, the electric power generating unit may further include an electrode disposed on the triboelectric layer.

According to an aspect of the present invention, the friction unit may be disposed to cover the electric power generating unit and the friction unit is aligned with the uneven surface.

According to an aspect of the present invention, the holder may be part of an electric device and the electric power generating unit is electrically coupled to an electronic component in the electric device.

According to an aspect of the present invention, the electric power generating unit may be electrically coupled to a rechargeable battery in the electric device.

According to an aspect of the present invention, the electric device may be a remote controller.

According to an aspect of the present invention, the friction unit may be coupled to a remote control button.

According to an aspect of the present invention, the friction unit may be configured to be powered by an external force of human power, wind power, water power, or electrical/mechanical power to deform the electric power generating unit with respect to the uneven surface of the holder.

According to an aspect of the present invention, the holder may further include an insulator.

According to an aspect of the present invention, the uneven surface may be a concave surface. The uneven surface is a patterned surface. The uneven surface may have a U shape cross-section. The uneven surface may have a shape of hemisphere.

According to an aspect of the present invention, the triboelectric layer may have an uneven surface.

According to an aspect of the present invention, the friction unit may be configured to be stepped on by feet or run over by automobiles.

A method of generating electricity by a triboelectric charging device according to one or more embodiments of the present invention may include providing a pressure or friction to the triboelectric charging device including, an electric power generating unit including, a triboelectric layer having a triboelectric material; a polyester layer disposed to face the triboelectric layer; and a graphene layer interposed between the triboelectric layer and the polyester layer; a holder accommodating the electric power generating unit and having a concave surface configured to receive a portion of the electric power generating unit when it is deformed; and a friction unit disposed to face the electric power generating unit and configured to deform the electric power generating unit, wherein the friction unit is disposed to face the uneven surface; and using electricity generated from the electric power generating unit.

According to another aspect of the present invention, a ball-electric power generator is provided. The ball-electric power generator can include a first upper layer configured to be electrically charged; a first lower layer configured to be electrically charged; at least one ball configured to be electrically charged; at least one spacer connected to a lower surface of the first upper layer and to an upper surface of the first lower layer; and at least one chamber defined by the first upper layer, the first lower layer and the at least one spacer, wherein the at least one ball is configured to be moved inside the at least one chamber and to hit the first upper and lower layers, and thereby generating triboelectric charges.

Further, the ball-electric power generator can include a second upper layer integrally connected to an upper surface of the first upper layer and a second lower layer integrally connected to a lower surface of the first lower layer. Each of the first upper layer and the first lower layer can be an electrode layer configured to be positively charged and comprises one of Al, Fe. Ni, Cu, Ag, indium tin oxide (ITO), graphene or a carbon nanotube (CNT), and the at least one ball is configured to be negatively charged and comprises one of polytetrafluoroethylene, polydimethylsiloxane (PDMS), polyvinyl chloride (PVC), or polystyrene (PS), and wherein the first upper layer and the first lower layer are connected to one another through a wire, and thereby generating voltage due to an electric potential difference between the positively charged first upper and lower layers. Each of the second upper and lower layers can include polyethylene naphthalate (PEN), polyethylene terephthalate (PET), polyethersulfone (PES) or a metal template and is configured to support each of the first upper and lower layers.

According to another aspect of the present invention, the at least one ball is configured to be moved by an external force of human power, wind power, water power, electrical or mechanical power.

According to another aspect of the present invention, the first upper layer can be an electrode layer configured to be positively charged, and the first lower layer and the at least one ball are configured to be negatively charged and comprise one of polytetrafluoroethylene, polydimethylsiloxane (PDMS), polyvinyl chloride (PVC), or polystyrene (PS).

According to another aspect of the present invention, the first upper layer is an electrode layer configured to be positively charged, the first lower layer and the at least one ball are configured to be negatively charged, the first lower layer comprises polyethylene naphthalate (PEN), polyethylene terephthalate (PET), or polyethersulfone (PES), and the at least one ball comprises one of polytetrafluoroethylene, polydimethylsiloxane (PDMS), polyvinyl chloride (PVC), or polystyrene (PS).

According to another aspect of the present invention, the second upper layer can include one of polyethylene naphthalate (PEN), polyethylene terephthalate (PET), or polyethersulfone (PES), and the second lower layer is an electrode layer including one of Al, Fe. Ni, Cu, Ag, indium tin oxide (ITO), graphene or a carbon nanotube (CNT), and the first upper layer and the second lower layer are connected to one another through a wire, thereby generating voltage due an electrical potential difference between the positively charged first upper layer and the second lower layer.

According to another aspect of the present invention, each of the first upper layer and the first lower layer is configured to be negatively charged and comprises polytetrafluoroethylene, polydimethylsiloxane (PDMS), polyvinyl chloride (PVC), or polystyrene (PS), and the at least one ball is configured to be positively charged and comprises one of Al, Fe. Ni, Cu, or Ag. Further, each of the second upper layer and the second lower layer can be an electrode including one of metal, indium tin oxide (ITO), graphene or a carbon nanotube (CNT).

In accordance with another aspect of the present invention, the at least one spacer can include more than two spacers, the at least one chamber can include more than two chambers defined by the more than two spacers, and each of the more than two chambers is configured to contain the at least one ball.

In accordance with another aspect of the present invention, the ball-electric power generator can further include at least one inlet air tube configured to blow air into the at least one chamber so as to move the at least one ball inside the at least one chamber, and can include at least one outlet air tube configured to discharge air out of the at least one chamber, wherein the inner diameter of the at least one outlet air tube is smaller than the diameter of the at least one ball.

In accordance with another aspect of the present invention, the at least one ball is in a size of nanometers to centimeters in diameter. Specifically, the at least one ball is in a size of 3.5 centimeters in diameter.

In accordance with another aspect of the present invention, the at least one ball is in a shape of one of wires, rods, cubes, or sheets, and is in a size of nanometers to centimeters in length or height.

In accordance with another aspect of the present invention, the ball-electric power generator is configured to be installed in a remote controller.

In accordance with another aspect of the present invention, the ball-electric power generator is connected to a cover sheet disposed thereover, such that the cover sheet is configured to be trodden on by feet or run over by automobiles.

In accordance with another aspect of the present invention, the ball-electric power generator is configured to be installed in an electric automobile and to charge a rechargeable battery.

BRIEF DESCRIPTION OF THE DRAWINGS

These and other aspects will become apparent and more readily appreciated from the following description of the embodiments, taken in conjunction with the accompanying drawings of which.

The features and advantages of the present invention will become more apparent from the detailed description set forth below when taken in conjunction with the drawings in which like reference numbers indicate identical or functionally similar elements.

DETAILED DESCRIPTION

Figure 1:
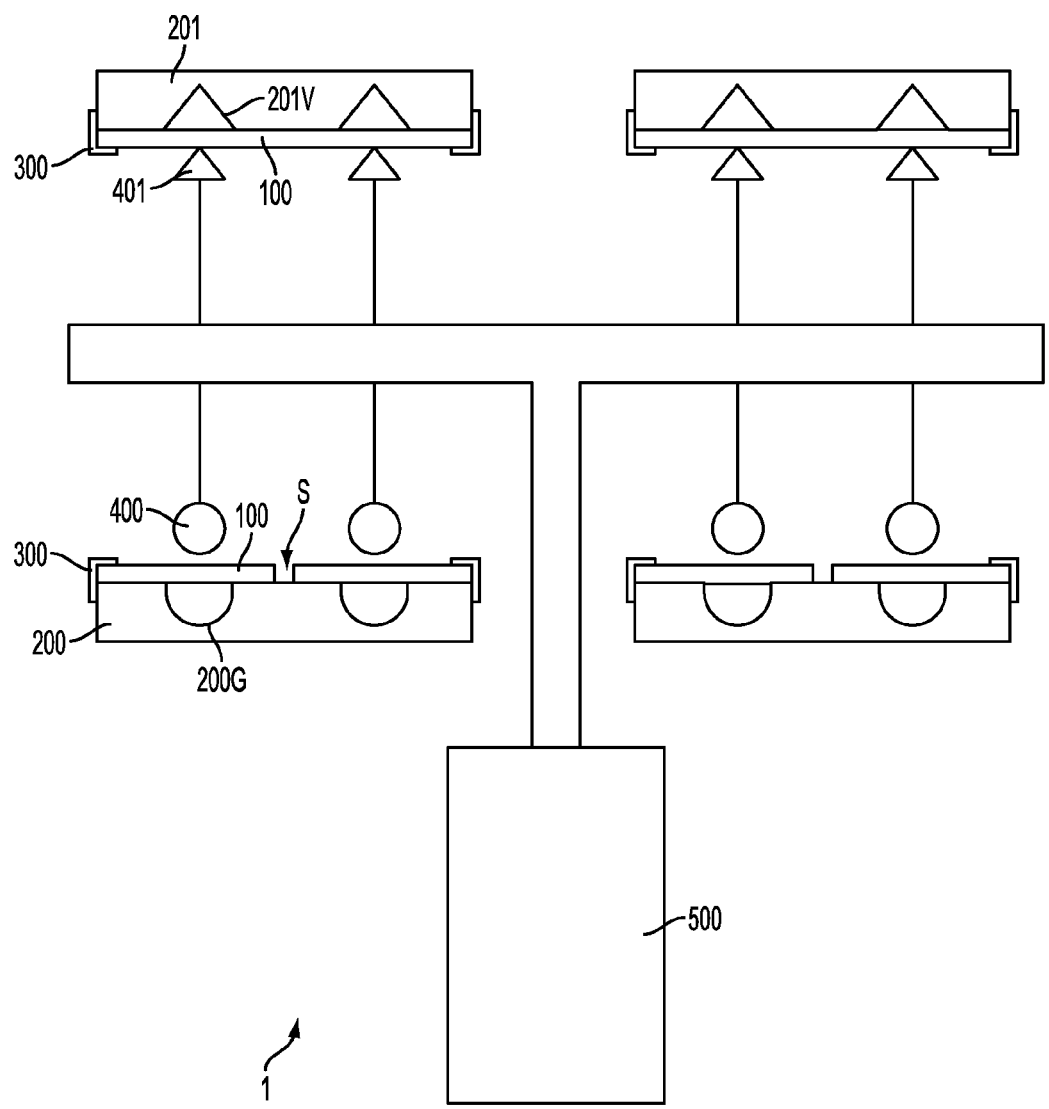
FIG. 1 is a conceptual drawing showing a triboelectric charging device according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or addition of one or more other elements, steps, operations, and/or components. The terms "first", "second, and the like may be used to describe various elements, but do not limit the elements. Such terms are only used to classify one element from another.

Figure 2:
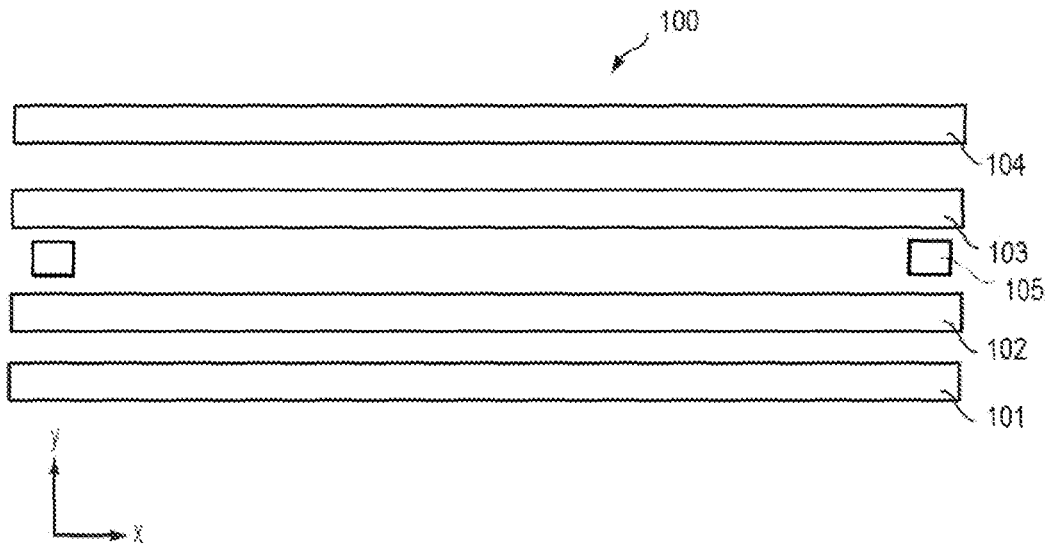
FIG. 2 is a cross-sectional view showing an electric power generating unit according to another embodiment of the present invention.

These and/or other aspects will become apparent and more readily appreciated from the following description of embodiments of the present invention, taken in conjunction with the accompanying drawings of which:

FIG. 1 is a conceptual drawing showing a graphene triboelectric charging device according to an embodiment of the present invention. FIG. 2 is a cross-sectional view showing an electric power generating unit.

Referring to FIG. 1, a graphene triboelectric charging device 1 may include an electric power generating unit 100, a holder 200, a fastener 300, and a friction unit 400. Here, the fastener 300 may be omitted. Thus, the triboelectric charging device 1 may include the electric power generating unit 100, the holder 200, and the friction unit 400.

Referring to FIGS. 1 and 2, an electric power generating unit 100 may include a triboelectric layer 102, a graphene layer 103, and a polyester layer 104. The polyester layer 104 may be disposed to face the triboelectric layer 102. The graphene layer 103 may be interposed between the triboelectric layer 102 and the polyester layer 104.

The triboelectric layer 102 may include a triboelectric material such as polydimethylsiloxane (PDMS) and/or polymethyl methacrylate (PMMA). The polyester layer 104 may include polyethylene terephthalate (PET) and/or polyethersulfone (PES).

A set of the triboelectric layer 102 and the polyester layer 104 operates as a triboelectric generator when the triboelectric layer 102 rubs against the polyester layer 104. The polyester tends to donate electrons, while the triboelectric material including PDMS and/or PMMA on the triboelectric layer 102 accepts electrons. After the triboelectric layer 102 and the polyester layer 104 scrub together, they may be mechanically separated, creating an air gap that isolates the charge on the triboelectric layer 102 surface and forms a dipole moment. If an electrical load is then connected between the triboelectric layer 102 and the polyester layer 104, a small current will flow to balance the charge potential. By continuously rubbing the triboelectric layer 102 and the polyester layer 104 and then promptly separating them, the electric power generating unit 100 can provide a small alternating current.

The graphene layer 103 may be disposed on the polyester layer 104 to face the triboelectric layer 102. Graphene has a number of remarkable mechanical and electrical properties. It is substantially stronger than steel, and it is very stretchable. The thermal and electrical conductivity is very high and it can be used as a flexible conductor. These characteristics of graphene will increase the function of the electric power generating unit 100.

The electric power generating unit 100 may further include a plurality of slits S, which prevent the electric power generating unit 100 from being rent while being pushed or bent.

The holder 200 may be configured to accommodate the electric power generating unit 100. The holder 200 is configured for engaging and holding the electric power generating unit 100 on a first side of the electric power generating unit 100. The holder 200 is configured to hold and support the electric power generating unit 100, and provides an insulation to keep the electric charges generated on the side surfaces of the electric power generating unit 100.

The holder 200 may have an uneven surface configured to receive a portion of the electric power generating unit 100 when it is deformed (pressed, rubbed or bent) by external force. The uneven surface may be a groove 200G. The groove 200G may be provided on the first side of the holder 200. The groove 200G can have any shape such that the electric power generating unit 100 can be pushed into and change its own shape for generating electricity. For example, the holder 201 may have an uneven surface such as a valley 201V having a V shape cross section. The structure of the uneven surface is not limited thereto. For example, the uneven surface may include a shape of cone in three dimension, a shape of extended V-cut across the holder 200, a U shape for a cross-section, a shape of hemisphere in three dimension, and/or a shape of extended U-cut across the holder 200. The uneven surface may have a concave surface, a patterned surface or convex shape.

The holder 200 may be made of, but not limited to, plastic. The holder 200 can include an insulator. Additionally, it must satisfy other mechanical requirements for supporting the electric power generating unit 100 in place. Further, the faster 300 may fastens the electric power generating unit 100 to the holder 200.

The friction unit 400 may be disposed to face the electric power generating unit 100 and configured to deform the electric power generating unit 100. Also, the friction unit 400 may be disposed to face the uneven surface. The friction unit 400 may have a shape fitting the groove 200G, such that the electric power generating unit 100 may be pushed by the friction unit 400 and deformed into a shape of the groove 200G, still not receiving any further strain on itself.

The friction unit 400 may include one or more elastic member (not shown) for itself. Thus, with an external force applied thereto, the friction unit 400 pushes the portion of the electric power generating unit 100 into the uneven surface such as groove 200G, and as soon as the external force is removed, the friction unit 400 would be retreated from the groove 200G making the electric power generating unit 100 recover its original shape. The friction unit 400 may be disposed to cover the electric power generating unit 100 and the friction unit 400 may be aligned with the uneven surface.

The friction unit 400 may be configured to be stepped on by feet or run over by automobiles. Thus, the triboelectric charging device 1 may be used as precast pavers on the road or sidewalk to generate electricity. Further, the friction unit 400 may be configured to be powered by an external force of human power, wind power, water power, or electrical/mechanical power.

The friction unit 400 may be connected to a driver 500. The driver may be installed such that the electric power generating unit 100 or the friction unit 400 is aligned with the uneven surface of the holder 200 in pushing and releasing. The driver 500 may provide a driving force which is oscillating back and forth. The driver 500 may be connected to a mechanical arm.

Although it is not shown in the figures, the triboelectric charging device 1 may further include a rechargeable battery for storing the generated electricity. The battery is coupled to the electric power generating unit 100 to collect the generated charges.

The holder 200 may be part of an electric device and the electric power generating unit 100 may be electrically coupled to an electronic component in the electric device including a light-emitting diode (LED) light.

Small electronic devices, such as a remote controller for television, automobile, garage door and/or boats etc., require a small amount of electricity. The electric power generating unit 100 is able to generate a small amount of electricity, and thus a device including the electric power generating unit 100 can be used as a self-powered device. While single-use batteries generate environmental pollution, the device incorporating the electric power generating unit 100 may reduce such pollution.

Referring to FIG. 2, the electric power generating unit 100 may include further a spacer 105 interposed between the triboelectric layer 102 and the polyester layer 104. The spacer 105 may be disposed between the triboelectric layer 102 and the graphene layer 103. Thus, the spacer 105 provides a structure that the graphene layer 103 may be spaced apart from the triboelectric layer 102. The layers may be put together through means such as glue (not shown) but not limited thereto.

When an external force applies to the polyester layer 104 and the graphene layer 103, the polyester layer 104 and the graphene layer 103 will be bent and make a contact with the triboelectric layer 102. After the triboelectric layer 102 and the polyester layer 104 rub together, they may be mechanically separated due to the layers' elastic properties and the spacer 105. The electric power generating unit 100 is resilient enough and, after it is deformed, it may recover an original shape, especially due to the high elastic property of the graphene layer 103.

The external force may be applied to the electric power generating unit 100 along the X, Y, Z axis directions. However, the direction of the external force is not limited thereto. The external force may be applied to the electric power generating unit 100 along a direction forming an arbitrary angle with the X, Y, Z axis directions.

The electric power generating unit 100 may include further an electrode 101. The electrode 101 may be disposed on the triboelectric layer 102. However, the location of the electrode 101 is not limited thereto. For example, the electrode 101 may be electrically coupled to either the graphene layer 103 or the polyester layer 104.

The triboelectric charging device 1 may comprise a stack of a plurality of the electric power generating unit 100 and at least each of the plurality of the electric power generating unit 100 is electrically coupled to at least one another of the plurality of the electric power generating unit 100 in parallel, in series or in a combination thereof. If necessary, the number of stacking the electric power generating unit 100 can be increased. For example, the electric power generating unit 100 may include ten electric power generating units 100.

Figure 3:
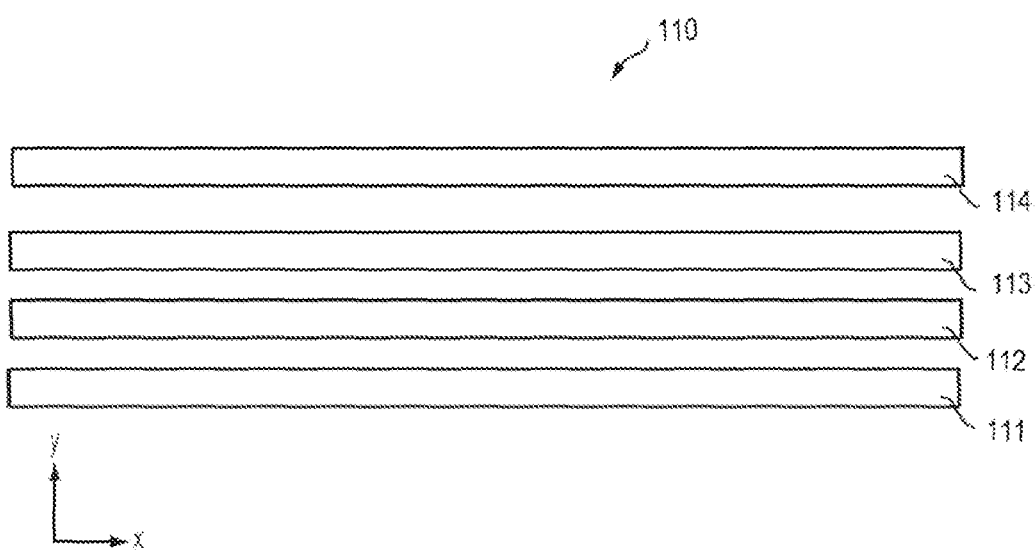
FIG. 3 illustrates another embodiment that is a variation of FIG. 2.

FIG. 3 illustrates an embodiment that is a variation of FIG. 2. Referring to FIG. 3, the electric power generating unit 110 may include an electrode 111, a triboelectric layer 112, a graphene layer 113, and a polyester layer 114. As shown in FIG. 3, the spacer 105 may be omitted.

Figure 4:
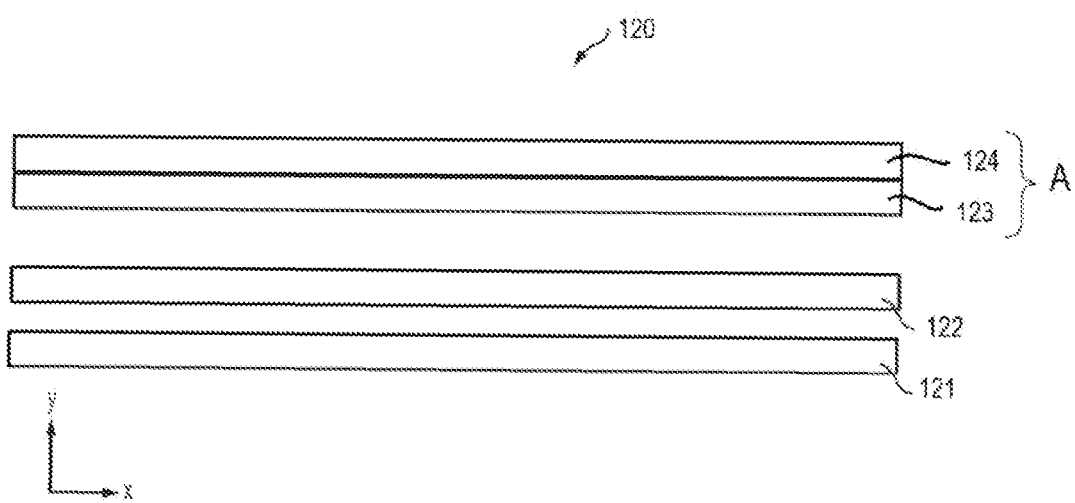
FIG. 4 illustrates another embodiment that is another variation of FIG. 2.

FIG. 4 illustrates an embodiment that is another variation of FIG. 2. Referring to FIG. 4, the electric power generating unit 120 may include an electrode 121, a triboelectric layer 122, a graphene layer 123, and a polyester layer 124. As shown in FIG. 4, the graphene layer 123 may be coated on the polyester layer 124 to form a graphene/PET layer A.

Figure 5:
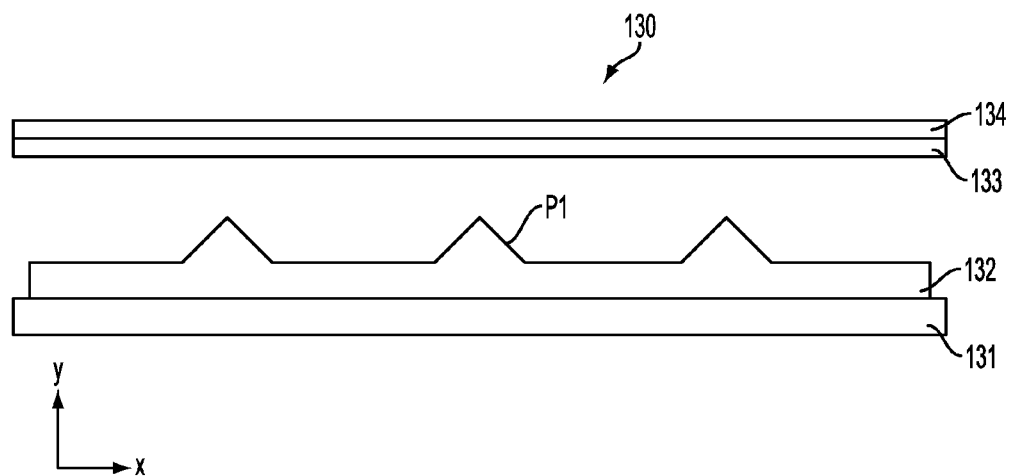
FIG. 5 illustrates another embodiment that is another variation of FIG. 2.

The triboelectric layer 132 may have an uneven surface. The triboelectric layer 132 may have a plurality of surface patterns. FIG. 5 illustrates an embodiment that is another variation of FIG. 2. Referring to FIG. 5, the electric power generating unit 130 may include an electrode 131, a triboelectric layer 132, a graphene layer 133, and a polyester layer 134. As shown in FIG. 5, the triboelectric layer 132 may have a first protrusion P1. The first protrusion has a V shape cross-section. The first protrusion may have a pyramids shape. The triboelectric layer 132 may have a plurality of the first protrusions P1.

Figure 6:
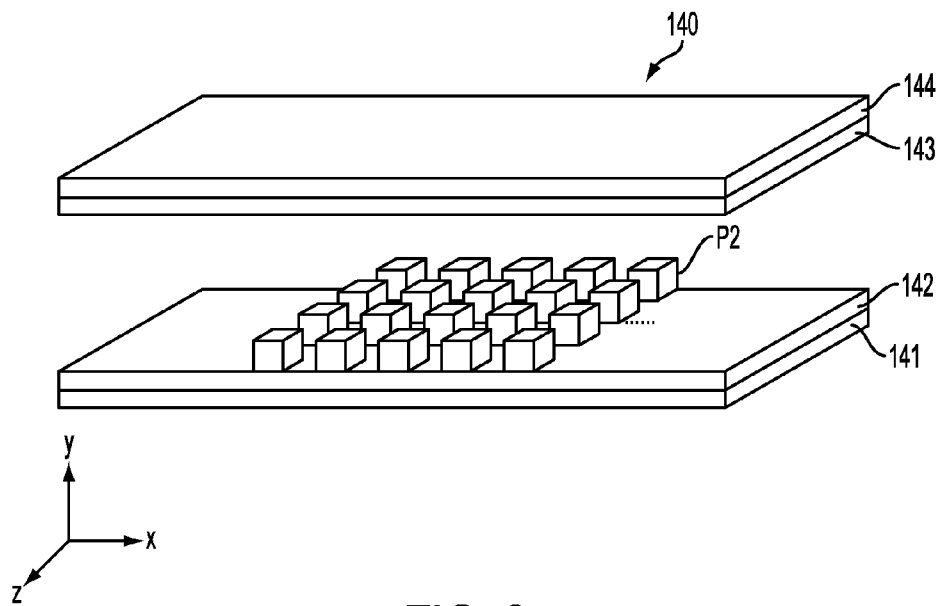
FIG. 6 is a perspective view showing another embodiment that is another variation of FIG. 2.

FIG. 6 is a perspective view showing an embodiment that is another variation of FIG. 2. Referring to FIG. 6, the electric power generating unit 140 may include an electrode 141, a triboelectric layer 142, a graphene layer 143, and a polyester layer 144. As shown in FIG. 6, the triboelectric layer 142 may have a second protrusion P2. The second protrusion has a rectangle shape cross-section. The second protrusion may have a cube shape. The triboelectric layer 142 may have a plurality of the second protrusions P2.

Figure 7:
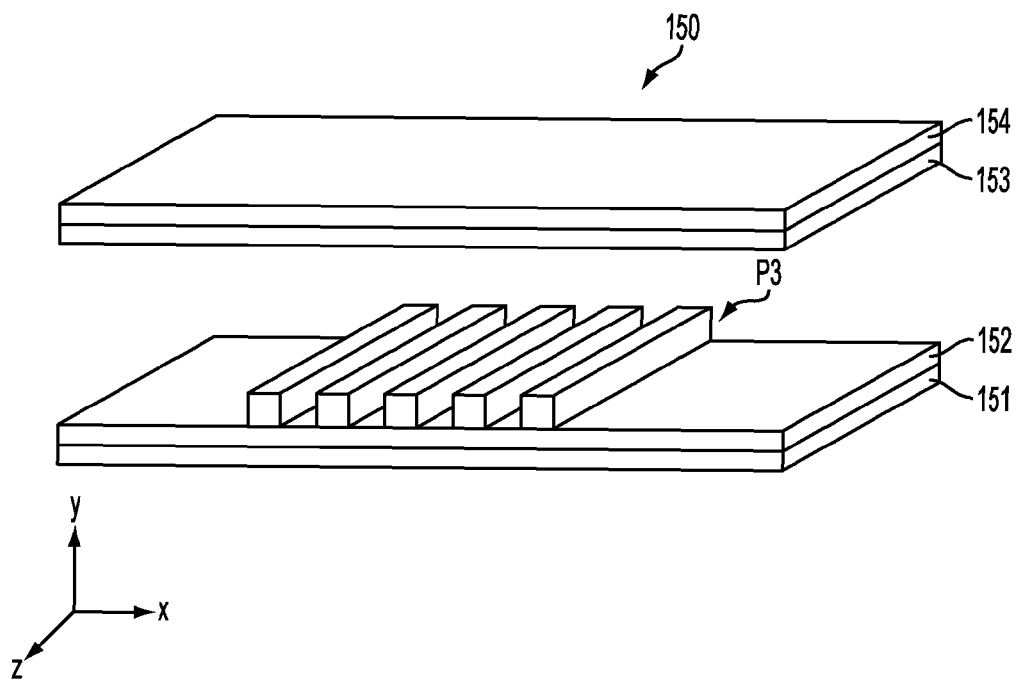
FIG. 7 is a perspective view showing another embodiment that is another variation of FIG. 2.

FIG. 7 is a perspective view showing an embodiment that is another variation of FIG. 2. Referring to FIG. 7, the electric power generating unit 150 may include an electrode 151, a triboelectric layer 152, a graphene layer 153, and a polyester layer 154. As shown in FIG. 7, the triboelectric layer 152 may have a third protrusion P3. The third protrusion has a rectangle shape cross-section. The third protrusion may have a rectangle bar shape. The triboelectric layer 152 may have a plurality of the third protrusions P3. While smooth surfaces rubbing together do generate charge, uneven surfaces rubbing together will generate charge with more efficiency.

Figure 8:
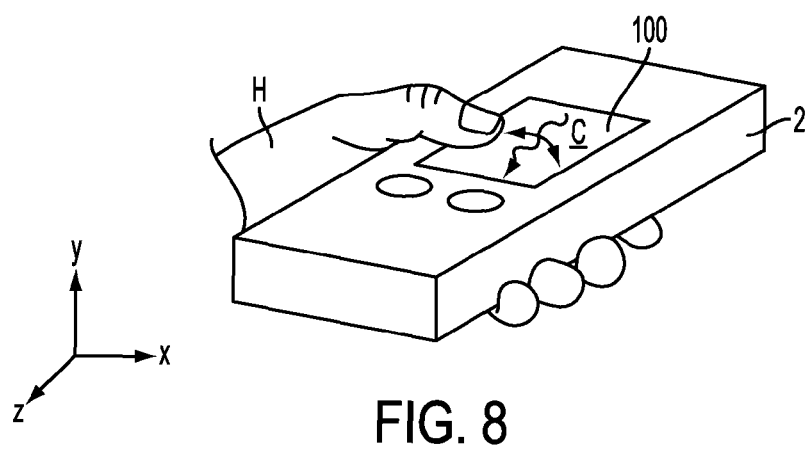
FIG. 8 is a perspective view showing an example of a remote controller according to the present invention.
Figure 9:
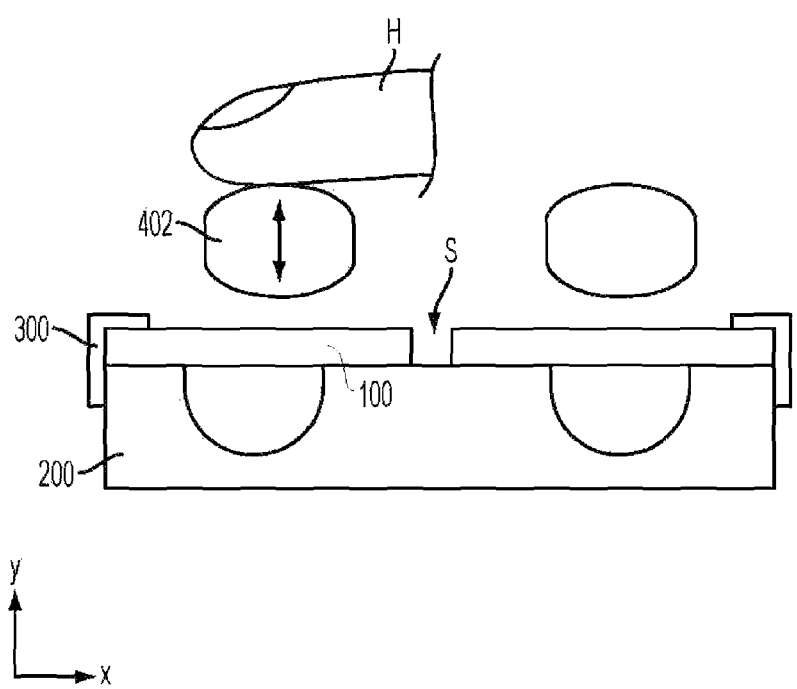
FIG. 9 is a cross-sectional view showing an example of a remote controller button according to the present invention.

FIG. 8 is a perspective view showing an example of a remote controller according to the present invention. FIG. 9 is a cross-sectional view showing an example of a remote controller button according to the present invention.

Referring to FIGS. 8 and 9, the triboelectric charging device 1 may be part of a remote controller 2 and the electric power generating unit 100 is electrically coupled to either an electronic component (not shown) in the remote controller 2 or a rechargeable battery in the remote controller.

As shown in FIG. 8, when a user applies friction and/or pressure by a hand H as denoted by arrow C onto the electric power generating unit 100, the electric power generating unit 100 generates electricity and the generated electricity can be either stored in the rechargeable battery or consumed by the electronic component in the remote controller 2.

Referring to FIG. 9, the triboelectric charging device 1 is applied to a remote control key pad including a friction unit 402, e.g., a button. FIG. 9 shows the electric power generating unit 100, the holder 200, the fastener 300, the friction unit 402 and slit S. When a user's hand H presses the friction unit 402, which is a part of the key pad, the electric power generating unit 100 generates electricity, which can be either stored in the rechargeable battery or consumed by the electronic components in the remote controller.

A method of generating electricity by a triboelectric charging device according to one or more embodiments of the present invention includes providing a pressure or friction to the triboelectric charging device including: an electric power generating unit including: a triboelectric layer having a triboelectric material, a polyester layer disposed to face the triboelectric layer, and a graphene layer interposed between the triboelectric layer and the polyester layer, a holder accommodating the electric power generating unit and having a concave surface configured to receive a portion of the electric power generating unit when it is deformed (pressed, rubbed or bent) by external force, and a friction unit disposed to face the electric power generating unit and configured to deform the electric power generating unit, wherein the friction unit is disposed to face the uneven surface, and using electricity generated from the electric power generating unit.

Referring to FIGS. 10-14, a ball-electric power generator 600 is provided. The ball-electric power generator 600 can include a first upper layer 620 configured to be electrically charged, a first lower layer 640 configured to be electrically charged, balls 660 configured to be electrically charged, a spacer 630 connected to a lower surface of the first upper layer 620 and to an upper surface of the first lower layer 640, and a chamber 670 defined by the first upper layer 620, the first lower layer 640 and the spacer 630. In particular, when the ball electric power generator 600 is moved or vibrated by a person or any external force, the balls 660 can be moved inside the chamber 670 to hit the first upper and lower layers 620, 640, and therefore triboelectric charges can be generated. The external force can be human power, wind power, water power, electrical or mechanical power.

Further, the ball-electric power generator 600 can include a second upper layer 610 integrally connected to an upper surface of the first upper layer 620 and a second lower layer 650 integrally connected to a lower surface of the first lower layer 640.

The first upper and lower layers 620, 640, the second upper and lower layers 610, 650, and the balls 660 can be made of different kinds of materials, flexible or rigid, that can be charged positively or negatively depending on their tendencies to gain electrons. The following are a list of materials that can be used for the layers and balls: polyformaldehyde, etylcellulose, polyamide, melamine formol, knitted wool, woven silk, aliminum, paper, woven cotton, steel, wood, hard rubber, nickel, copper, sulfur, brass, silver, acetate, rayon, polymethyl methacrylate (e.g., Lucite®), polyvinyl alcohol, polyester (e.g., Dacron®), polyisobutylene, polyurethane flexible sponge, polyethylene terephthalate, polyvinyl butyral, polychlorobutadiene, natural rubber, polyacrilonitrile, acrylonitrile-vinyl chloride, polybisphenol carbonate, polychloroether, polyvinylidine chloride (e.g., Saran®), polystyrene, polyethylene, polypropylene, polyimide (e.g., Kapton®), polyvinyl chloride (PVC), polydimethylsiloxane (PDMS), polytetrafluoroethylene (e.g., Teflon®). When two of these materials are in contact with each other, triboelectric charges can be generated by friction and one material will be charged positively and the other material will be charged negatively. In the above list, the materials listed earlier have a tendency to be charged positively and the materials listed later have a tendency to be charged negatively by friction when they are in contact with one another.

Figure 10:
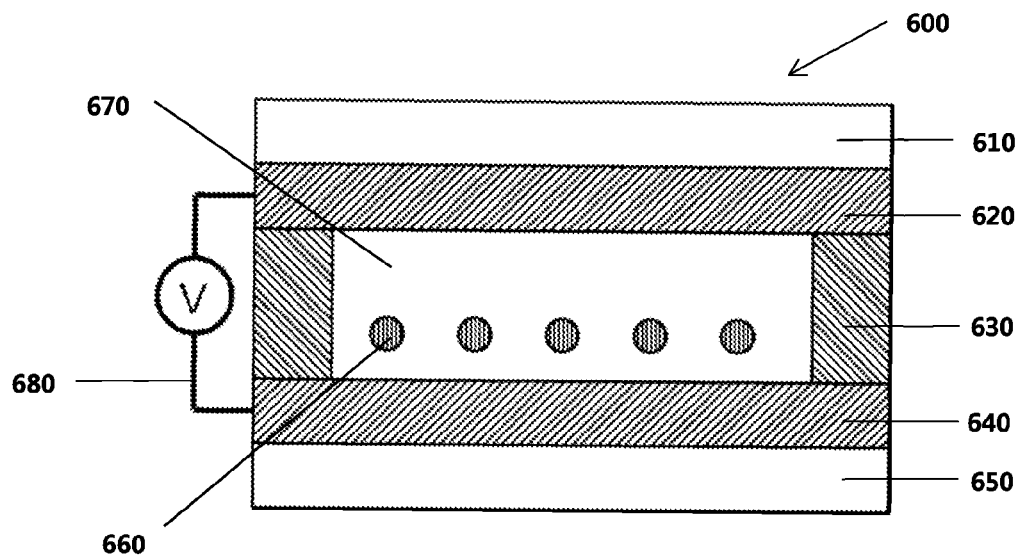
FIG. 10 is a cross-sectional view of a first embodiment of a ball-electric generator of the according to the present invention.

Referring to FIG. 10, each of the first upper layer 620 and the first lower layer 640 can be an electrode layer configured to be positively charged and can be made of rigid or flexible materials including Al, Fe. Ni, Cu, Ag, indium tin oxide (ITO), graphene and a carbon nanotube (CNT), while the balls 670 can be negatively charged and can be made of one of polytetrafluoroethylene, polydimethylsiloxane (PDMS), polyvinyl chloride (PVC), or polystyrene (PS). The first upper layer 620 and the first lower layer 640 are connected to one another through a wire 680, and thereby generating voltage due to an electric potential difference between the positively charged first upper and lower layers 620, 640. Although the first upper layer 620 and the first lower layer 640 are both positively charged, one layer can have less positive electrons against the other such that there will be the electric potential difference between the two layers. As a preferred example, Al can be used for the first upper and lower layers 620,640, and Teflon® can be used for the balls 660.

Further, each of the second upper and lower layers 610, 650 can be made of materials including polyethylene naphthalate (PEN), polyethylene terephthalate (PET), polyethersulfone (PES) and a metal template, and is configured to support each of the first upper and lower layers 620, 640.

Further, the balls 660 can be in a shape of one of sphere, wires, rods, cubes, sheets, and the like, and is in a size of nanometers to centimeters in diameter, length or height. As an example, the balls 660 can be in a size of 3.5 centimeters in diameter. Further, the ball-electric power generator 600 can be installed in the remote controller 2 as shown in FIG. 8.

Further, the ball-electric power generator 600 can be connected to a cover sheet disposed thereover, such that the cover sheet is configured to be trodden on by feet or run over by automobiles, as shown for example in FIGS. 4 and 5 of U.S. Pat. No. 8,269,401. Also, the ball-electric power generator 600 can be configured to be installed in an electric automobile, and to charge a rechargeable battery.

Figure 11:
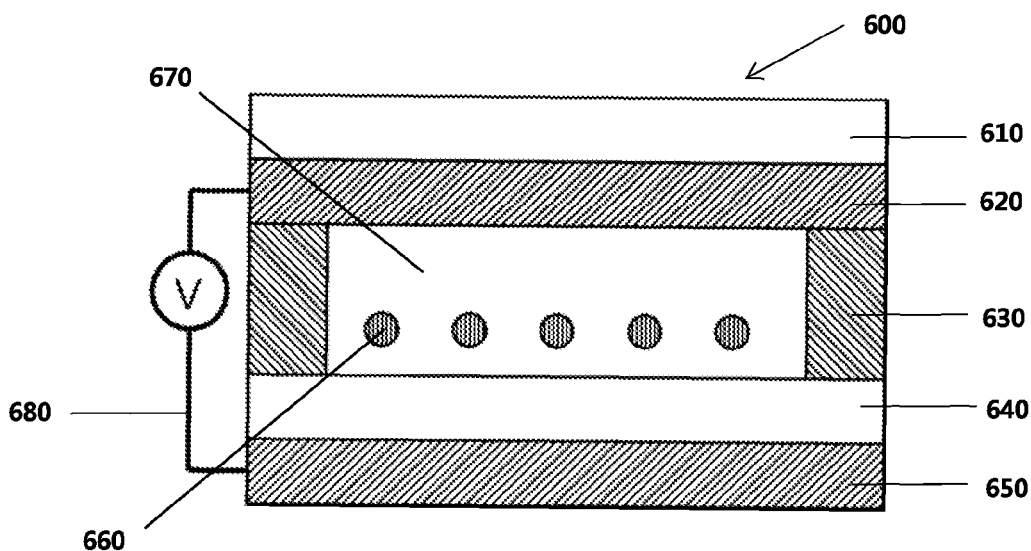
FIG. 11 is a cross-sectional view of a second embodiment of the ball-electric generator according to the present invention.

Referring to FIG. 11, the first upper layer 620 can be an electrode layer configured to be positively charged, and can be made of Al, Fe. Ni, Cu, Ag, indium tin oxide (ITO), graphene or a carbon nanotube (CNT). The first lower layer 640 and the balls 660 are configured to be negatively charged, and can be made of polytetrafluoroethylene (e.g., Teflon®), polydimethylsiloxane (PDMS), polyvinyl chloride (PVC), or polystyrene (PS). Alternatively, the first lower layer 640 can be made of polyethylene naphthalate (PEN), polyethylene terephthalate (PET), or polyethersulfone (PES) while the balls 660 can be made of polytetrafluoroethylene (e.g., Teflon®), polydimethylsiloxane (PDMS), polyvinyl chloride (PVC), or polystyrene (PS).

The second upper layer 610 can be made of one of polyethylene naphthalate (PEN), polyethylene terephthalate (PET), or polyethersulfone (PES), and the second lower layer 650 can be an electrode layer including one of Al, Fe. Ni, Cu, Ag, indium tin oxide (ITO), graphene or a carbon nanotube (CNT). Also, the first upper layer 620 and the second lower layer 650 can be connected to one another through the wire 680, thereby generating voltage due to an electrical potential difference between the positively charged first upper layer 620 and the second lower layer 650.

Figure 12:
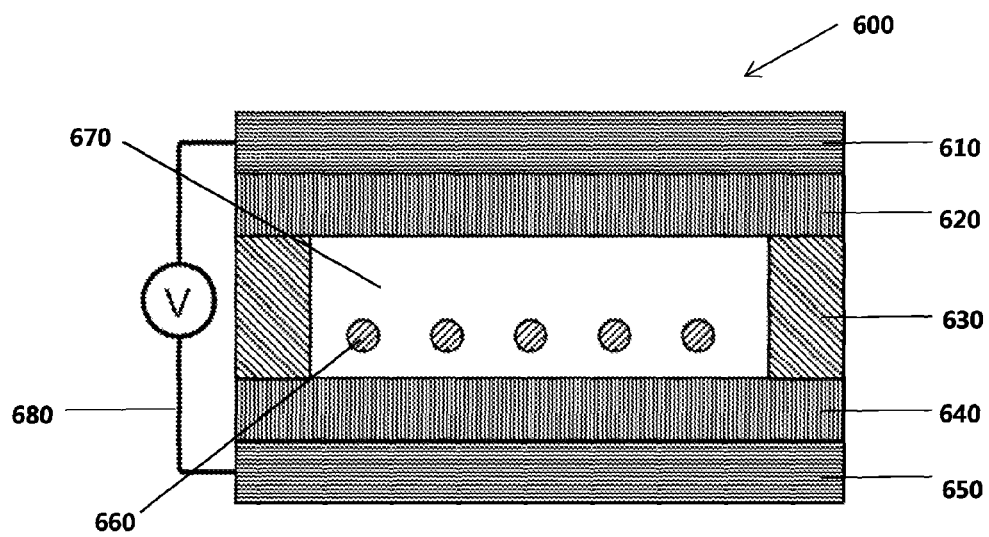
FIG. 12 is a cross-sectional view of a third embodiment of the ball-electric generator according to the present invention.

Referring to FIG. 12, each of the first upper layer 620 and the first lower layer 640 is configured to be negatively charged and can be made of polytetrafluoroethylene (e.g., Teflon®), polydimethylsiloxane (PDMS), polyvinyl chloride (PVC), or polystyrene (PS). On the other hand, the balls 660 are configured to be positively charged and can be made of a metal including Al, Fe. Ni, Cu and Ag. Further, each of the second upper layer 610 and the second lower layer 650 can be an electrode made of metal, indium tin oxide (ITO), graphene or a carbon nanotube (CNT).

Figure 13:
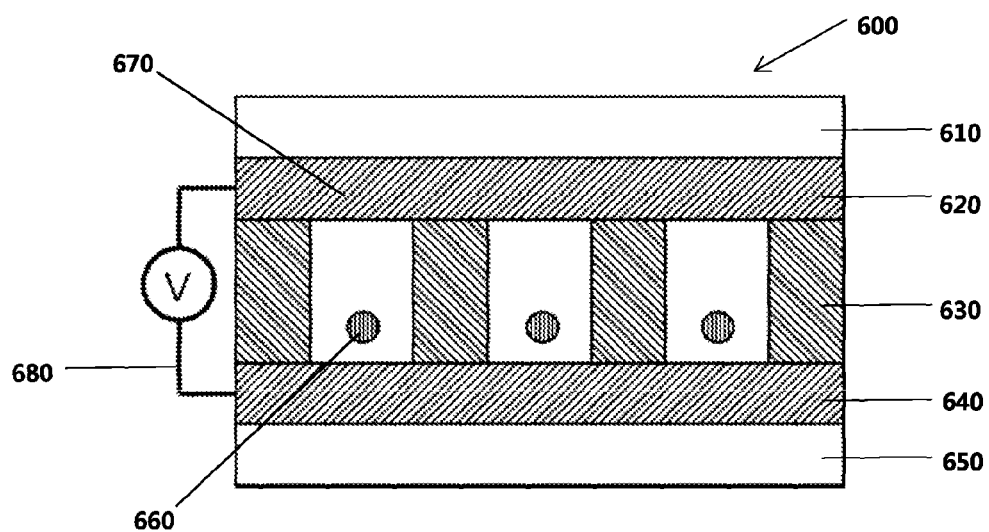
FIG. 13 is a cross-sectional view of a fourth embodiment of the ball-electric generator according to the present invention.

Referring to FIG. 13, the structure and materials used for the first upper and lower layers 620, 640 and the second upper and lower layers 610, 650 are the same as those for the embodiment shown in FIG. 12. Further, the ball-electric power generator 600 shown in FIG. 13 can include more than two spacers 630 such that it can have more than two chambers 670 defined by more than the two spacers 670 and the balls 660 can be contained in each of the chambers 670.

Figure 14:
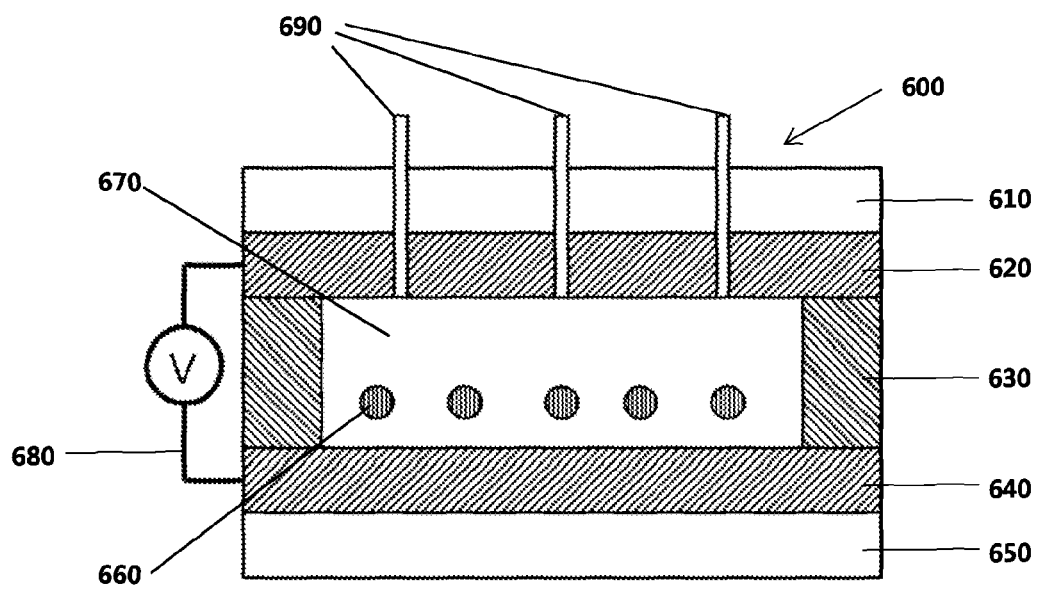
FIG. 14 is a cross-sectional view of a fifth embodiment of the ball-electric generator according to the present invention.

Referring to FIG. 14, the ball-electric power generator 600 can further include air tubes 690. One of the air tubes 690 can be an air inlet tube configured to blow air into the chamber 670 so as to move the balls 660 inside the chamber 670. Also, one of the air tubes 690 can be an outlet air tube configured to discharge air out of the chamber 670 such that the inner diameter of the outlet air tube is smaller than the diameter of the balls 660.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A ball-electric power generator comprising:
a first upper layer configured to be electrically charged;
a first lower layer configured to be electrically charged;
at least one ball configured to be electrically charged;
at least one spacer connected to the first upper layer and to the first lower layer;
at least one chamber defined by the first upper layer, the first lower layer and the at least one spacer; and
a second upper layer integrally connected to an upper surface of the first upper layer and a second lower layer integrally connected to a lower surface of the first lower layer,
wherein the at least one ball is configured to be moved inside the at least one chamber and to hit the first upper and lower layers, and thereby generating triboelectric charges, and
wherein each of the first upper layer and the first lower layer is configured to be negatively charged and comprises polytetrafluoroethylene, polydimethylsiloxane (PDMS), polyvinyl chloride (PVC), or polystyrene (PS), and the at least one ball is configured to be positively charged and comprises one of Al, Fe, Ni, Cu, or Ag.

2. The ball-electric power generator of claim 1, wherein the at least one ball is configured to be moved by an external force of human power, wind power, water power, electrical or mechanical power.

3. The ball-electric power generator of claim 1, wherein each of the second upper layer and the second lower layer is an electrode comprising one of metal, indium tin oxide (ITO), graphene or a carbon nanotube (CNT).

4. The ball-electric power generator of claim 1, wherein the at least one spacer comprises more than two spacers, the at least one chamber comprises more than two chambers defined by the more than two spacers, and each of the more than two chambers is configured to contain the at least one ball.

5. The ball-electric power generator of claim 1, wherein the at least one ball is in a size of nanometers to centimeters in diameter.

6. The ball-electric power generator of claim 5, wherein the at least one ball is in a size of 3.5 centimeters in diameter.

7. The ball-electric power generator of claim 1, wherein the ball-electric power generator is configured to be installed in a remote controller.

8. The ball-electric power generator of claim 1, wherein the ball-electric power generator is connected to a cover sheet disposed thereover, such that the cover sheet is configured to be trodden on by feet or run over by automobiles.

9. The ball-electric power generator of claim 1, wherein the ball-electric power generator is configured to be installed in an electric automobile and to charge a rechargeable battery.

10. A ball-electric power generator comprising:
a first upper layer configured to be electrically charged;
a first lower layer configured to be electrically charged;
at least one ball configured to be electrically charged;
at least one spacer connected to the first upper layer and to the first lower layer;
at least one chamber defined by the first upper layer, the first lower layer and the at least one spacer;
a second upper layer integrally connected to an upper surface of the first upper layer and a second lower layer integrally connected to a lower surface of the first lower layer,
at least one inlet air tube configured to blow air into the at least one chamber so as to move the at least one ball inside the at least one chamber; and
at least one outlet air tube configured to discharge air out of the at least one chamber, wherein the inner diameter of the at least one outlet air tube is smaller than the diameter of the at least one ball,
wherein the at least one ball is configured to be moved inside the at least one chamber and to hit the first upper and lower layers, and thereby generating triboelectric charges.

* * * * *